United States Patent
Shi et al.

(10) Patent No.: US 11,539,414 B2
(45) Date of Patent: Dec. 27, 2022

(54) WIRELESS COMMUNICATION METHOD AND DEVICE

(71) Applicant: GUANGDONG OPPO MOBILE TELECOMMUNICATIONS CORP., LTD., Guangdong (CN)

(72) Inventors: Zhihua Shi, Guangdong (CN); Wenhong Chen, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 116 days.

(21) Appl. No.: 17/007,383

(22) Filed: Aug. 31, 2020

(65) Prior Publication Data

US 2020/0403678 A1 Dec. 24, 2020

Related U.S. Application Data (63) Continuation of application No. PCT/CN2018/077867, filed on Mar. 2, 2018.

(51) Int. Cl.
*H04B 7/06* (2006.01)
*H04L 5/00* (2006.01)
(Continued)

(52) U.S. Cl.
CPC ......... *H04B 7/0626* (2013.01); *H04L 5/0094* (2013.01); *H04W 72/042* (2013.01);
(Continued)

(58) Field of Classification Search
CPC ... H04B 7/0626; H04L 5/0053; H04L 5/0057; H04L 5/0094; H04W 24/10;
(Continued)

(56) References Cited

U.S. PATENT DOCUMENTS 10,727,920 B2 *  7/2020  Wei .................. H04L 5/005
11,006,303 B2 *  5/2021  Yum .................. H04B 7/0695
(Continued)

FOREIGN PATENT DOCUMENTS

CN    102255689 A    11/2011
CN    102394855 A     3/2012
(Continued)

OTHER PUBLICATIONS

ZTE et al., Remaining details on CSI reporting, Jan. 22, 2018, 3GPP TSG RAN WG1 Meeting AH 1801, Vancouver, Canada, Tdoc: R1-1800109 (Year: 2018).*

(Continued)

*Primary Examiner* — Eric Nowlin
(74) *Attorney, Agent, or Firm* — Perkins Coie LLP (57) ABSTRACT

Implementations of the present application provide a wireless communication method and device, being able to match a relatively flexible NR system in terms of CSI feedback. The method comprises: sending first information, the first information being carried in downlink control information (DCI), the first information being used to trigger the terminal to report aperiodic channel state information (CSI) or to report semi-persistent CSI; determining a first uplink time-domain position according to a time offset and a first downlink time-domain position acting as a starting point, the time unit length of the time offset being a time unit length of uplink transmission for CSI reporting, or being a time unit length of downlink transmission performed on the first downlink time-domain position; receiving the CSI reported by the terminal at the first uplink time-domain position.

12 Claims, 6 Drawing Sheets

(51) Int. Cl.
  *H04W 72/04* (2009.01)
  *H04W 72/12* (2009.01)
(52) U.S. Cl.
  CPC ... *H04W 72/0446* (2013.01); *H04W 72/0493* (2013.01); *H04W 72/1263* (2013.01)
(58) Field of Classification Search
  CPC ............... H04W 48/12; H04W 72/042; H04W 72/0446; H04W 72/0493; H04W 72/1263
  See application file for complete search history.

(56) References Cited

U.S. PATENT DOCUMENTS

| | | | | |
|---|---|---|---|---|
| 11,160,088 | B2* | 10/2021 | Li | H04L 1/0003 |
| 2014/0126476 | A1 | 5/2014 | Kang et al. | |
| 2017/0063479 | A1 | 3/2017 | Kim et al. | |
| 2018/0014219 | A1 | 1/2018 | Takeda et al. | |
| 2018/0220400 | A1* | 8/2018 | Nogami | H04L 5/0053 |
| 2018/0278392 | A1* | 9/2018 | Onggosanusi | H04L 5/005 |
| 2019/0089436 | A1* | 3/2019 | Wei | H04L 5/0057 |
| 2019/0098523 | A1* | 3/2019 | Muruganathan | H04W 24/10 |
| 2019/0123801 | A1 | 4/2019 | Yum et al. | |
| 2019/0229874 | A1* | 7/2019 | Lee | H04L 5/00 |
| 2019/0342782 | A1* | 11/2019 | Yum | H04W 72/0413 |
| 2019/0357224 | A1* | 11/2019 | Li | H04L 5/0055 |
| 2020/0106551 | A1* | 4/2020 | Shi | H04W 72/042 |
| 2020/0127789 | A1* | 4/2020 | Lee | H04L 5/14 |
| 2020/0313823 | A1* | 10/2020 | Zhang | H04W 72/042 |
| 2020/0403678 | A1* | 12/2020 | Shi | H04W 72/1263 |

FOREIGN PATENT DOCUMENTS

| | | | | |
|---|---|---|---|---|
| CN | 102595476 | A | | 7/2012 |
| CN | 102595596 | A | | 7/2012 |
| CN | 102281131 | B | | 11/2013 |
| CN | 107046436 | A | | 8/2017 |
| CN | 107211412 | A | | 9/2017 |
| CN | 107645783 | A | | 1/2018 |
| CN | 2018030714 | A1 | | 2/2018 |
| CN | 104980252 | B | | 4/2018 |
| CN | 110035546 | A * | | 7/2019 ........... H04B 7/0626 |
| CN | 105827378 | B | | 9/2019 |
| EP | 3471311 | A1 | | 4/2019 |
| JP | 2014519750 | A | | 8/2014 |
| JP | 2021510951 | A * | | 2/2018 ........... H04B 7/0626 |
| KR | 101589030 | B1 | | 1/2016 |
| WO | 2017222329 | A1 | | 12/2017 |
| WO | 2018030714 | A1 | | 2/2018 |
| WO | WO-2019157663 | A1 * | | 8/2019 ........... H04B 7/0626 |

OTHER PUBLICATIONS

MediaTek Inc., Remaining issues in CSI reporting, Jan. 22, 2018, 3GPP TSG RAN WG1 Meeting AH 1801, Vancouver, Canada, Tdoc: R1-1800157 (Year: 2018).*
Vivo, Remaining issues and text proposals on CSI reporting, Jan. 22, 2018, 3GPP TSG RAN WG1 Meeting AH 1801, Vancouver, Canada, Tdoc: R1-1800184 (Year: 2018).*
Intel Corporation, Remaining issues on CSI reporting, Jan. 22, 2018, 3GPP TSG RAN WG1 Meeting AH 1801, Vancouver, Canada, Tdoc: R1-1800310 (Year: 2018).*
Huawei et al., Processing time for A-CSI reporting, Jan. 22, 2018, 3GPP TSG RAN WG1 Meeting AH 1801, Vancouver, Canada, Tdoc: R1-1800532 (Year: 2018).*
AT&T, Several remaining details on aperiodic CSI report, Jan. 22, 2018, 3GPP TSG RAN WG1 Meeting AH 1801, Vancouver, Canada, Tdoc: R1-1800581 (Year: 2018).*
InterDigital, Inc., Remaining details on CSI reporting, Jan. 22, 2018, 3GPP TSG RAN WG1 Meeting AH 1801, Vancouver, Canada, Tdoc: R1-1800628 (Year: 2018).*
MediaTek Inc., Remaining issues in CSI reporting, Jan. 22, 2018, 3GPP TSG RAN WG1 Meeting AH 1801, Vancouver, Canada, Tdoc: R1-1801061 (Year: 2018).*
Ericsson, Summary of CSI reporting v3, Jan. 22, 2018, 3GPP TSG RAN WG1 Meeting AH 1801, Vancouver, Canada, Tdoc: R1-1801069 (Year: 2018).*
LG Electronics et al., WF on UE capability on CSI reporting and relaxation, Jan. 22, 2018, 3GPP TSG RAN WG1 Meeting AH 1801, Vancouver, Canada, Tdoc: R1- 1801185 (Year: 2018).*
LG Electronics et al., WF on UE capability on CSI reporting and relaxation, Jan. 22, 2018, 3GPP TSG RAN WG1 Meeting AH 1801, Vancouver, Canada, Tdoc: R1- 1801222 (Year: 2018).*
MediaTek Inc., Remaining issues in CSI reporting, Feb. 26, 2018, 3GPP TSG RAN WG1 Meeting #92, Athens, Greece, Tdoc: R1-1801654 (Year: 2018).*
InterDigital, Inc., Remaining issues on CSI reporting, Feb. 26, 2018, 3GPP TSG RAN WG1 Meeting #92, Athens, Greece, Tdoc: R1-1802618 (Year: 2018).*
Sharp, Discussions on aperiodic CSI reporting in CA case, Feb. 26, 2018, 3GPP TSG RAN WG1 Meeting #92, Athens, Greece, Tdoc: R1-1802663 (Year: 2018).*
Sharp, Discussions on aperiodic CSI reporting in CA case, Feb. 26, 2018, 3GPP TSG RAN WG1 Meeting #92, Athens, Greece, Tdoc: R1-1802666 (Year: 2018).*
Qualcomm Incorporated, Maintenance for CSI Reporting, Feb. 26, 2018, 3GPP TSG RAN WG1 Meeting #92, Athens, Greece , Tdoc: R1-1802822 (Year: 2018).*
Qualcomm Incorporated, Qualcomm Incorporated, Maintenance for CSI Reporting, Feb. 26, 2018, 3GPP TSG RAN WG1 Meeting #92, Athens, Greece, Tdoc: R1-1803243 (Year: 2018).*
Sharp, On A-CSI reporting for NR, Feb. 26, 2018, 3GPP TSG RAN WG1 Meeting #92, Athens, Greece, Tdoc: R1-1803261 (Year: 2018).*
Sharp, On A-CSI reporting for NR, Feb. 26, 2018, 3GPP TSG RAN WG1 Meeting #92, Athens, Greece, Tdoc: R1-1803262 (Year: 2018).*
Ericsson, Summary of CSI reporting v1, Feb. 26, 2018, 3GPP TSG RAN WG1 Meeting #92, Athens, Greece, Tdoc: R1-1803267 (Year: 2018).*
Ericsson, Summary of CSI reporting v2, Feb. 26, 2018, 3GPP TSG RAN WG1 Meeting #92, Athens, Greece, Tdoc: R1-1803296 (Year: 2018).*
Ericsson, Summary of CSI reporting v3, Feb. 26, 2018, 3GPP TSG RAN WG1 Meeting #92, Athens, Greece, Tdoc: R1-1803301 (Year: 2018).*
Ericsson, CSI reporting offline session notes, Feb. 26, 2018, 3GPP TSG RAN WG1 Meeting #92, Athens, Greece, Tdoc: R1-1803339 (Year: 2018).*
LG Electronics et al., WF on UE capability on CSI reporting and relaxation, Feb. 26, 2018, 3GPP TSG RAN WG1 Meeting #92 , Athens, Greece, Tdoc: R1-1803418 (Year: 2018).*
Ericsson, Offline session notes 2 for CSI reporting, Feb. 26, 2018, 3GPP TSG RAN WG1 Meeting #92, Athens, Greece, Tdoc: R1-1803419 (Year: 2018).*
3rd Generation Partnership Project, 3GPP TS 38.214, Technical Specification Group Radio Access Network; NR; Physical layer procedures for data; Dec. 2017; Version 15.0.0 (Year: 2017).*
International Search Report dated Nov. 2, 2018 of PCT/CN2018/077867 (4 pages).
The First Office Action dated Feb. 3, 2002 of Chinese Application No. 201880003222.5 (17 pages).
Supplementary European Search Report of European Patent Application No. 18907684.7 dated Oct. 28, 2020 (8 pages).
3GPP TS 38.214 V15.1.0 (Mar. 2018)—3rd Generation Partnership Project; Technical Specification Group Radio Access Network; NR; Physical Layer procedures for data (Release 15) (77 pages).
3GPP TSG RAN WG1 Meeting AH 1801, Vancouver, Canada, Jan. 22-26, 2018—R1-1800108—ZTE, Sanechips, Remaining details on CSI measurement (4 pages).
EPO, Examination Report for European Patent Application No. 18907684.7. dated Feb. 24, 2021. 5 pages.
IPA, Examination Report No. 1 for Australian Patent Application No. 2018411307. dated Mar. 31, 2021. 5 pages.
Examination Report for Indian Application No. 202027034303 dated Sep. 6, 2021. 8 pages with English translation.

(56) References Cited

OTHER PUBLICATIONS

Notice of Reasons for Refusal for Japanese Application No. 2020-543971 dated Aug. 27, 2021. 8 pages with English translation.
Notification of Reason for Refusal for Korean Application No. 10-2020-7025926 dated Aug. 30, 2021. 13 pages with English translation.
Vivo "Remaining issues on CSI reporting" R1-1801519;3GPP TSG RAN WG1 Meeting #92; Feb. 26-Mar. 2, 2018. 10 pages.
Notice of Reasons for Refusal for Japanese Application No. 2020-543971 dated Dec. 14, 2021. 6 pages with English translation.
Notice of Allowance of the Korean application No. 10-2020-7025926, dated Mar. 16, 2022. 4 pages with English Translation.
First Office Action of the Chinese application No. 202010785218.8, dated May 31, 2022. 14 pages with English Translation.
First Written Opinion of the Singaporean application No. 11202007616Y, dated Jun. 29, 2022. 9 pages.

* cited by examiner

WIRELESS COMMUNICATION METHOD AND DEVICE

CROSS-REFERENCE TO RELATED APPLICATION

This application is a continuation application of International Application No. PCT/CN2018/077867, filed on Mar. 2, 2018, the entire disclosure of which is hereby incorporated by reference.

BACKGROUND

Technical Field

This application relates to the field of communications, and more specifically, to a wireless communications method and a device.

Related Art

In a long term evolution (LTE) system, a terminal may obtain channel state information (CSI), and report the CSI to a base station periodically or aperiodically.

In a New Radio (NR) system, relatively high flexibility of communication is required.

How to match a relatively flexible NR system in an aspect of CSI feedback is a problem to be urgently resolved.

SUMMARY

Implementations of this application provide a wireless communications method and a device.

According to a first aspect, a wireless communications method is provided, including:

sending first information, where the first information is carried in downlink control information (DCI), and is used for triggering a terminal to perform aperiodic channel state information (CSI) reporting or semi-persistent CSI reporting;

determining a first uplink (UL) time domain location according to a time offset and a first downlink (DL) time domain location used as a start point, where a time unit length of the time offset is a time unit length of UL transmission used for performing CSI reporting, or a time unit length of DL transmission performed in the first DL time domain location; and receiving CSI reported by the terminal in the first UL time domain location.

With reference to the first aspect, in a possible implementation of the first aspect, the method further includes:

sending second information, where the second information is used for indicating the time offset to the terminal.

With reference to the first aspect or any one of the possible implementations described above, in another possible implementation of the first aspect, the second information and the first information are carried in the same DCI.

With reference to the first aspect or any one of the possible implementations described above, in another possible implementation of the first aspect, the first information is used for triggering the terminal to perform the semi-persistent CSI reporting; the first DL time domain location is a periodic time domain location, and the first UL time domain location is a periodic time domain location.

With reference to the first aspect or any one of the possible implementations described above, in another possible implementation of the first aspect, the first DL time domain location is:

at least one of symbols in which the first information is located, or a slot in which the first information is located, or a last symbol of the slot; or at least one of symbols in which a channel measurement resource for performing CSI measurement is located, or a slot in which the channel measurement resource for performing CSI measurement is located, or a last symbol of the slot; or at least one of symbols in which an interference resource for performing CSI measurement is located, or a slot in which the interference resource for performing CSI measurement is located, or a last symbol of the slot; or at least one of symbols in which a CSI reference resource is located, or a slot in which the CSI reference resource is located, or a last symbol of the slot.

With reference to the first aspect or any one of the possible implementations described above, in another possible implementation of the first aspect, the time unit length of the time offset is the time unit length of the UL transmission, and the determining a first UL time domain location includes:

mapping the first DL time domain location to a second UL time domain location; and determining a time domain location, obtained by adding n times the time offset to the second UL time domain location, as the first UL time domain location, where n is an integer greater than or equal to 1.

With reference to the first aspect or any one of the possible implementations described above, in another possible implementation of the first aspect, the time unit length of the time offset is the time unit length of the DL transmission, and the determining a first UL time domain location includes:

obtaining a second DL time domain location by adding n times the time offset to the first DL time domain location, where n is an integer greater than or equal to 1; and mapping the second DL time domain location to the first UL time domain location.

With reference to the first aspect or any one of the possible implementations described above, in another possible implementation of the first aspect, the time unit length of the time offset is a slot.

With reference to the first aspect or any one of the possible implementations described above, in another possible implementation of the first aspect, a subcarrier spacing of the UL transmission used for performing CSI reporting is different from a subcarrier spacing of the DL transmission performed in the first DL time domain location.

According to a second aspect, a wireless communications method is provided, including:

receiving first information, where the first information is carried in DCI, and is used for triggering aperiodic CSI reporting or semi-persistent CSI reporting;

determining a first uplink (UL) time domain location according to a time offset and a first downlink (DL) time domain location used as a start point, where a time unit length of the time offset is a time unit length of UL transmission used for performing CSI reporting, or a time unit length of DL transmission performed in the first DL time domain location; and reporting CSI in the first UL time domain location.

With reference to the second aspect, in a possible implementation of the second aspect, the method further includes:

receiving second information, where the second information is used for indicating the time offset.

With reference to the second aspect or any one of the possible implementations described above, in another possible implementation of the second aspect, the second information and the first information are carried in the same DCI.

With reference to the second aspect or any one of the possible implementations described above, in another possible implementation of the second aspect, the first information is used for triggering the terminal to perform the semi-persistent CSI reporting; the first DL time domain location is a periodic time domain location, and the first UL time domain location is a periodic time domain location.

With reference to the second aspect or any one of the possible implementations described above, in another possible implementation of the second aspect, the first DL time domain location is:

at least one of symbols in which the second information is located, or a slot in which the second information is located, or a last symbol of the slot; or at least one of symbols in which a channel measurement resource for performing CSI measurement is located, or a slot in which the channel measurement resource for performing CSI measurement is located, or a last symbol of the slot; or at least one of symbols in which an interference resource for performing CSI measurement is located, or a slot in which the interference resource for performing CSI measurement is located, or a last symbol of the slot; or at least one of symbols in which a CSI reference resource is located, or a slot in which the CSI reference resource is located, or a last symbol of the slot.

With reference to the second aspect or any one of the possible implementations described above, in another possible implementation of the second aspect, the time unit length of the time offset is the time unit length of the UL transmission, and the determining a first UL time domain location includes:

mapping the first DL time domain location to a second UL time domain location; and determining a time domain location, obtained by adding n times the time offset to the second UL time domain location, as the first UL time domain location, where n is an integer greater than or equal to 1.

With reference to the second aspect or any one of the possible implementations described above, in another possible implementation of the second aspect, the time unit length of the time offset is the time unit length of the DL transmission, and the determining a first UL time domain location includes:

obtaining a second DL time domain location by adding n times the time offset to the first DL time domain location, where n is an integer greater than or equal to 1; and mapping the second DL time domain location to the first UL time domain location.

With reference to the second aspect or any one of the possible implementations described above, in another possible implementation of the second aspect, the time unit length of the time offset is a slot.

With reference to the second aspect or any one of the possible implementations described above, in another possible implementation of the second aspect, a subcarrier spacing of the UL transmission used for performing CSI reporting is different from a subcarrier spacing of the DL transmission performed in the first DL time domain location.

According to a third aspect, a network device is provided, configured to perform the foregoing method in the first aspect or any possible implementation of the first aspect. Specifically, the network device includes functional modules configured to perform the foregoing method in the first aspect or any possible implementation of the first aspect.

According to a fourth aspect, a terminal is provided, configured to perform the foregoing method in the second aspect or any possible implementation of the second aspect. Specifically, the terminal includes functional modules configured to perform the foregoing method in the second aspect or any possible implementation of the second aspect.

According to a fifth aspect, a network device is provided, including a processor, a memory, and a transceiver. The processor, the memory, and the transceiver communicate with each other through internal connection channels to transfer control and/or data signals, to enable the network device to perform the foregoing method in the first aspect or any possible implementation of the first aspect.

According to a sixth aspect, a terminal is provided, including a processor, a memory, and a transceiver. The processor, the memory, and the transceiver communicate with each other through internal connection channels to transfer control and/or data signals, to enable the terminal to perform the foregoing method in the second aspect or any possible implementation of the second aspect.

Therefore, a terminal or a network device may determine a UL time domain location used for feeding back CSI according to a first DL time domain location used as a start point and with reference to a time offset with a time unit length which is a time unit length of UL transmission used for performing CSI reporting, or which is a time unit length of DL transmission performed in the first DL time domain location. As a result, a CSI feedback is implemented when a time unit length of UL transmission (which is specifically the UL transmission used for performing CSI reporting) and a time unit length of DL transmission (which is specifically the DL transmission performed in the first DL time domain location) are different.

BRIEF DESCRIPTION OF THE DRAWINGS

To describe the technical solutions in the implementations of this application more clearly, the following briefly introduces the accompanying drawings for describing the implementations or the prior art. Apparently, the accompanying drawings in the following description show merely some implementations of this application, and a person of ordinary skill in the art may still derive other drawings from the accompanying drawings without creative efforts.

DETAILED DESCRIPTION

The technical solutions of the implementations of this application will be described in the following with reference to the accompanying drawings. It is obvious that the implementations to be described are a part rather than all of the implementations of this application. All other implementations obtained by persons of ordinary skill in the art based on the implementations of the present disclosure without making creative efforts shall fall within the protection scope of the present disclosure.

The technical solutions according to the implementations of this application may be applied to a variety of communications systems, such as a Global System for Mobile communication ("GSM" for short) system, a Code Division Multiple Access ("CDMA" for short) system, a Wideband Code Division Multiple Access ("WCDMA" for short) system, a General Packet Radio Service ("GPRS" for short), a Long Term Evolution ("LTE" for short) system, an LTE Frequency Division Duplex ("FDD" for short) system, an LTE Time Division Duplex ("TDD" for short), a Universal Mobile Telecommunications system ("UMTS" for short), a Worldwide Interoperability for Microwave Access ("WiMAX" for short) communications system, a future 5G system (which may also be referred to as a New Radio (NR) system), or the like.

Figure 1:
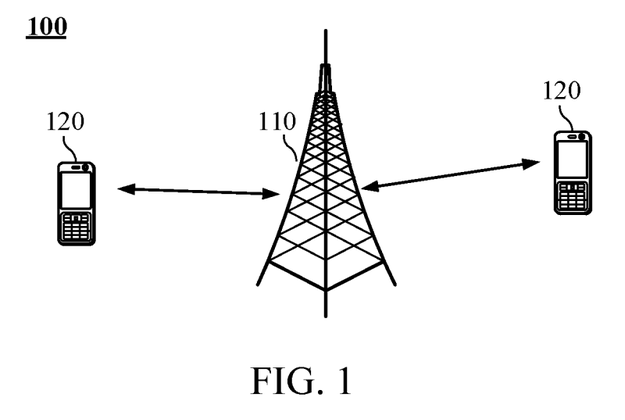
FIG. 1 is a schematic diagram of a wireless communications system according to an implementation of this application.

FIG. 1 shows a wireless communications system 100 to which an implementation of this application is applied. The wireless communications system 100 may include a network device 110. The network device 110 may be a device communicating with a terminal device. The network device 110 may provide communications coverage to a particular geographic area, and may communicate with a terminal device (for example, UE) located within the coverage area. Optionally, the network device 110 may be a base transceiver station (BTS) in a GSM system or CDMA system, or may be a NodeB (NB) in a WCDMA system, or may be an evolved NodeB (eNB or eNodeB) in an LTE system, or a wireless controller in a cloud radio access network (CRAN), or the network device may be a relay station, an access point, an in-vehicle device, a wearable device, a network side device in a future 5G network, a network device in a future evolved public land mobile network (PLMN) or the like.

The wireless communications system 100 further includes at least one terminal device 120 located within the coverage range of the network device 110. The terminal device 120 may be mobile or fixed. Optionally, the terminal device 120 may be an access terminal, user equipment (UE), a subscriber unit, a subscriber station, a mobile station, a mobile console, a remote station, a remote terminal, a mobile device, a user terminal, a terminal, a wireless communications device, a user agent, or a user apparatus. The access terminal may be a cellular phone, a cordless phone, a Session Initiation Protocol (SIP) phone, a wireless local loop (WLL) station, a personal digital assistant (PDA), a hand-held device having a wireless communication function, a computing device, another processing device connected to a wireless modem, an in-vehicle device, a wearable device, a terminal device in a future 5G network, a terminal device in a future evolved PLMN or the like.

Optionally, the terminal devices 120 may perform device-to-device (D2D) communication with each other.

Optionally, the 5G system or network may be further referred to as a New Radio (NR) system or network.

FIG. 1 shows one network device and two terminal devices as an example. Optionally, the wireless communications system 100 may include a plurality of network devices and coverage of each network device may include another quantity of terminal devices. This is not limited in this implementation of this application.

Optionally, the wireless communications system 100 may further include other network entities such as a network controller and a mobility management entity. This is not limited in this implementation of this application.

It should be understood that, terms "system" and "network" in this specification are usually interchangeably used in this specification. The term "and/or" in this specification is only an association relationship for describing the associated objects, and represents that three relationships may exist, for example, A and/or B may represent the following three cases: A exists separately, both A and B exist, and B exists separately. In addition, the character "/" in this specification generally indicates an "or" relationship between the associated objects.

Figure 2:
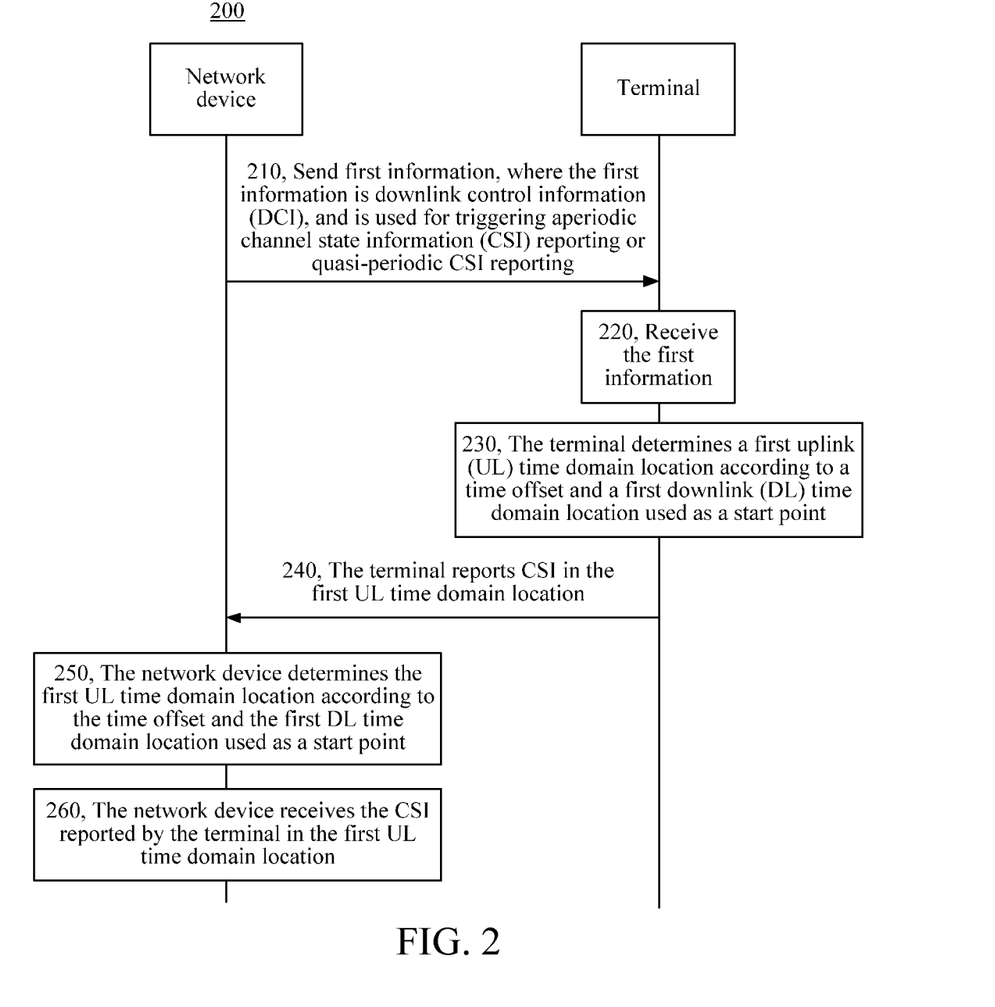
FIG. 2 is a schematic flowchart of a wireless communications method according to an implementation of this application.

FIG. 2 is a schematic flowchart of a wireless communications method 200 according to an implementation of this application. The method 200 may be optionally applied to the system shown in FIG. 1, but is not limited thereto. As shown in FIG. 2, the method 200 includes at least some of the following content.

210. A network device sends first information, where the first information is carried in DCI, and is used for triggering a terminal to perform aperiodic CSI reporting or semi-persistent CSI reporting.

In addition to carrying the first information, the DCI may further carry other information. This is not specifically limited in this implementation of this application.

Optionally, the aperiodic CSI reporting may be performing CSI reporting for a specific quantity of times (for example, once) after the first information is received.

Optionally, the semi-persistent CSI reporting may be performing CSI reporting periodically after the first information is received.

Optionally, the semi-persistent CSI reporting may be stopped after an instruction of instructing to stop performing the CSI reporting is received.

220. The terminal receives the first information.

230. The terminal determines a first UL time domain location according to a time offset and a first DL time domain location used as a start point, where a time unit length of the time offset is a time unit length of UL transmission used for performing CSI reporting, or a time unit length of DL transmission performed in the first DL time domain location.

Optionally, the network device may send second information to the terminal, where the second information carries the time offset.

Optionally, the first information and the second information may be carried in the same DCI.

Optionally, the time offset may be preset in the terminal.

Optionally, the time offset may be preset in the terminal through Radio Resource Control (RRC) signaling.

Optionally, the network device may send RRC to indicate a plurality of time offsets, and indicate a time offset used later in the DCI.

Optionally, numerologies of UL and DL transmission between the network device and the terminal may be different. Specifically, subcarrier spacings may be different, and therefore time unit lengths corresponding to the UL and DL transmission may be different, where the time unit may be a symbol, a slot, or the like.

That the time unit lengths corresponding to the UL and DL transmission between the network device and the terminal may be different means that a time unit length of the UL transmission for the CSI reporting is different from a time unit length of the DL transmission performed in the first DL time domain location.

Optionally, the time unit length of the time offset is a slot, that is, a unit of the time offset is a slot. However, it should be understood that, this implementation of this application is not limited thereto. For example, the unit of the time offset may alternatively be a symbol.

Optionally, in this implementation of this application, the time unit length of the time offset is a smaller one of the time unit length of the UL transmission used for performing CSI reporting and the time unit length of the DL transmission performed in the first DL time domain location.

Optionally, in this implementation of this application, when the time unit length of the UL transmission used for performing CSI reporting is less than the time unit length of the DL transmission performed in the first DL time domain location, the time unit length of the UL transmission used for performing CSI reporting may be used as the time unit length of the time offset.

Optionally, in this implementation of this application, when the time unit length of the UL transmission used for performing CSI reporting is greater than the time unit length of the DL transmission performed in the first DL time domain location, the time unit length of the UL transmission used for performing CSI reporting may be used as the time unit length of the time offset, or the time unit length of the DL transmission performed in the first DL time domain location may be used as the time unit length of the time offset.

Optionally, the first information is used for triggering the terminal to perform the semi-persistent CSI reporting; the first DL time domain location is a periodic time domain location, and the first UL time domain location is a periodic time domain location.

Optionally, in this implementation of this application, for semi-persistent CSI measurement, a channel measurement resource corresponding to the CSI measurement, an interference resource corresponding to the CSI measurement or a CSI reference resource may be periodic or semi-persistent.

Optionally, in this implementation of this application, for aperiodic CSI measurement, a channel measurement resource corresponding to the CSI measurement, an interference resource corresponding to the CSI measurement or a CSI reference resource may be periodic, semi-persistent or aperiodic.

Measurement assumptions may be made when the CSI measurement is performed, where the CSI reference resource is used for obtaining the measurement assumptions.

It should be understood that, the resource is periodic or semi-persistent, which means that transmission may be performed on the periodic or semi-persistent resource, but does not mean that the performed transmission needs to be periodic or semi-persistent.

Optionally, the first DL time domain location is:
a DL time domain location in which the first information is located; or
a DL time domain location in which the channel measurement resource for performing CSI measurement is located; or
a DL time domain location in which the interference resource for performing CSI measurement is located; or
a DL time domain location in which the CSI reference resource is located.

The time domain location in which the foregoing information or resource is located may be at least one of symbols in which the information or the resource is located, a slot in which the information or the resource is located, or at least one symbol in the slot.

Optionally, the first DL time domain location is:
at least one (for example, a first symbol or a last symbol) of symbols in which the first information is located, or a slot in which the first information is located, or a last symbol of the slot; or
at least one (for example, a first symbol or a last symbol) of symbols in which the channel measurement resource for performing CSI measurement is located, or a slot in which the channel measurement resource for performing CSI measurement is located, or a last symbol of the slot; or
at least one (for example, a first symbol or a last symbol) of symbols in which the interference resource for performing CSI measurement is located, or a slot in which the interference resource for performing CSI measurement is located, or a last symbol of the slot; or
at least one (for example, a first symbol or a last symbol) of symbols in which the CSI reference resource is located, or a slot in which the CSI reference resource is located, or a last symbol of the slot.

Optionally, the first UL time domain location determined in this implementation of this application may be a specific slot, but not a specific symbol of the slot determined based on the time offset and the first DL time domain location.

However, it should be understood that, this implementation of this application is not limited thereto. In this implementation of this application, a specific symbol of a specific slot may alternatively be determined. For example, a specific symbol location of the first UL time domain location may be determined with reference to a symbol location in the slot in which the first information is located.

Optionally, when the first information triggers the semi-persistent CSI reporting, the first DL time domain location is at least one of symbols in which a channel measurement resource for performing current CSI measurement is located, or a slot in which the channel measurement resource for performing the current CSI measurement is located, or a last symbol of the slot; or at least one of symbols in which an interference resource for performing the current CSI measurement is located, or a slot in which the interference resource for performing the current CSI measurement is located, or a last symbol of the slot; or at least one of symbols in which a CSI reference resource for performing the current CSI measurement is located, or a slot in which the CSI reference resource for performing the current CSI measurement is located, or a last symbol of the slot.

In an implementation, the time unit length of the time offset is the time unit length of the UL transmission, and the first DL time domain location is mapped to a second UL time domain location; a time domain location obtained by adding n times the time offset to the second UL time domain location is determined as the first UL time domain location, where n is an integer greater than or equal to 1.

Optionally, the second UL time domain location may be a slot.

Optionally, when the first DL time domain location is a slot and the second UL time domain location is a slot, if the first DL time domain location is mapped to a plurality of UL slots, and in this case, a UL subcarrier spacing is greater than a DL subcarrier spacing, one (for example, a first slot or a last slot) of the slots may be used as the second UL time domain location.

Optionally, when the first information triggers the aperiodic CSI reporting, the time offset may be added to the second UL time domain location to obtain the first UL time domain location. In this case, it means that n is 1.

Figure 3:
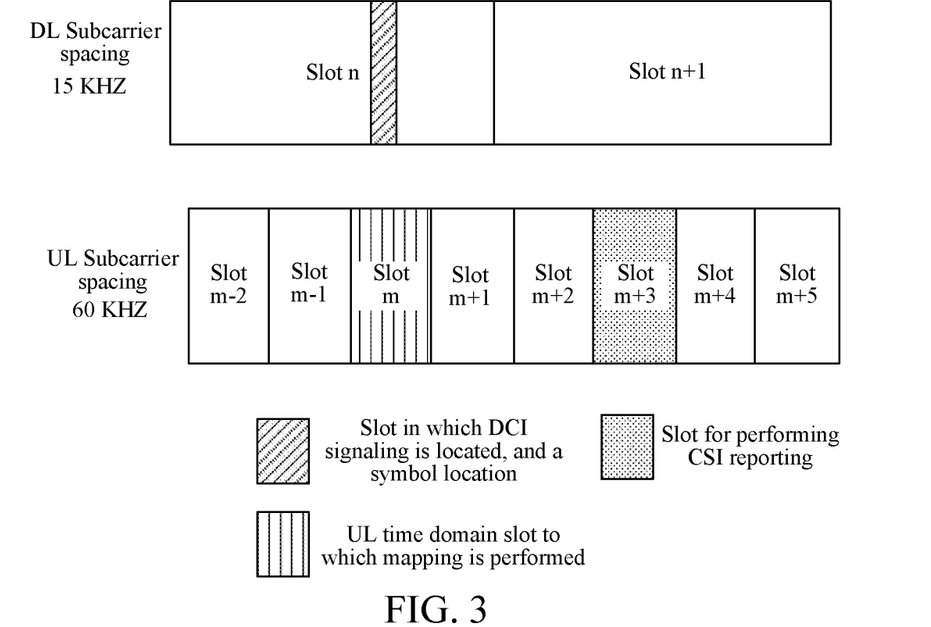
FIG. 3 is a location relationship diagram of a first DL time domain location and a first UL time domain location according to an implementation of this application.

For example, as shown in FIG. 3, a DL subcarrier spacing is 15 KHz, a UL subcarrier spacing is 60 KHz, a start point of a resource that calculates and feeds back the CSI is at least one symbol in which DCI signaling for triggering the aperiodic CSI reporting is located, and a defined time offset is defined based on a UL numerology. The DCI signaling is transmitted in at least one symbol in a DL slot n, the offset is 3, and therefore a slot of the aperiodic CSI reporting in a UL resource is equal to slot m (a UL slot to which at least one symbol, in which the DCI signaling is located, is mapped)+3.

It should be understood that, in FIG. 3, if the start point of the resource that calculates and feeds back the CSI is a slot in which the DCI signaling for triggering the aperiodic CSI reporting is located or at least one symbol of the slot, a slot of the aperiodic CSI reporting in the UL resource is equal to slot m+1 (a UL slot to which the slot, in which the DCI signaling is located, is mapped)+3.

Figure 4:
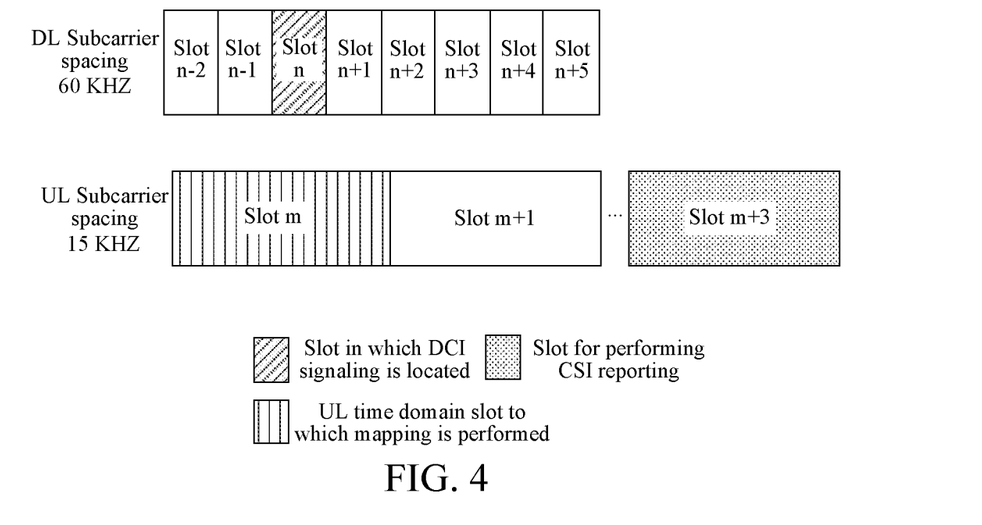
FIG. 4 is a location relationship diagram of a first DL time domain location and a first UL time domain location according to an implementation of this application.

For example, as shown in FIG. 4, the DL subcarrier spacing is 60 KHz, the UL subcarrier spacing is 15 KHz, the start point of the resource that calculates and feeds back the CSI is a slot in which the DCI signaling for triggering the aperiodic CSI reporting is located, and the defined time offset is defined based on the UL numerology. The DCI signaling is transmitted in the DL slot n, the offset is 3, and therefore a slot of the aperiodic CSI reporting in a UL resource is equal to slot m (a UL slot to which a DL slot, in which the DCI signaling is located, is mapped)+3.

It should be understood that, as shown in FIG. 4, if a start point that calculates CSI feedback is at least one symbol in which the DCI signaling for triggering the aperiodic CSI reporting is located, a slot of the aperiodic CSI reporting in the UL resource is equal to slot m (the UL slot to which the symbol, in which the DCI signaling is located, is mapped)+3.

Optionally, when the first information triggers the semi-persistent CSI reporting, if the first DL time domain location is at least one of the symbols in which the first information is located, or a slot in which the first information is located, or a last symbol of the slot, the first UL time domain location may be obtained by adding the time offset to the second UL time domain location when CSI feedback is performed for the first time, the first UL time domain location may be obtained by adding twice the time offset to the second UL time domain location calculated for the first time (in an actual calculation procedure, the first UL time domain location currently calculated may be obtained by adding the time offset to the first UL time domain location previously calculated) when CSI feedback is performed for the second time, and the rest can be deduced by analogy.

Optionally, when the first information triggers the semi-persistent CSI reporting, if the first DL time domain location is at least one of symbols in which a channel measurement resource for performing CSI measurement is located, or a slot in which the channel measurement resource for performing CSI measurement is located, or a last symbol of the slot; or at least one of symbols in which an interference resource for performing CSI measurement is located, or a slot in which the interference resource for performing CSI measurement is located, or a last symbol of the slot; or at least one of symbols in which a CSI reference resource is located, or a slot in which the CSI reference resource is located, or a last symbol of the slot, the second UL time domain location is determined based on the channel measurement resource, the interference resource or the reference resource for performing the current CSI measurement, and the first UL time domain location of the current CSI feedback may be obtained by adding the time offset to the second UL time domain location.

In another implementation, the time unit length of the time offset is a time unit length of the DL transmission, and the second DL time domain location is obtained by adding the time offset to the first DL time domain location. The second DL time domain location may be mapped to the first UL time domain location.

Optionally, the second DL time domain location is a slot.

Optionally, when the second DL time domain location is a slot and the first UL time domain location is a slot, if the second DL time domain location is mapped to a plurality of UL slots, and in this case, a UL subcarrier spacing is greater than a DL subcarrier spacing, one (for example, a first slot or a last slot) of the slots may be used as the second UL time domain location.

Optionally, when the first information triggers the aperiodic CSI reporting, the time offset may be added to the first DL time domain location to obtain the second DL time domain location. In this case, it means that n is 1.

Figure 5:
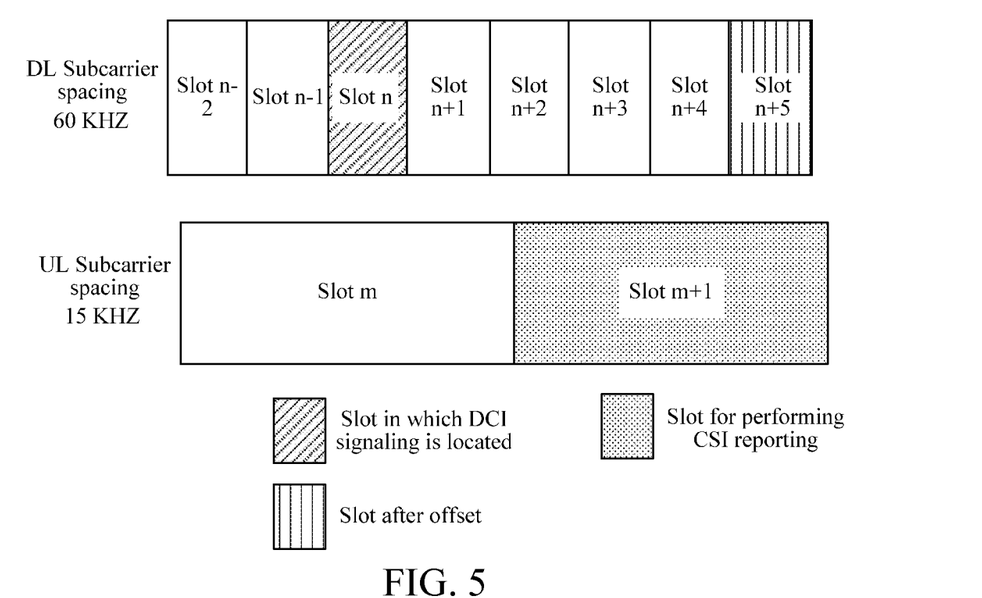
FIG. 5 is a location relationship diagram of a first DL time domain location and a first UL time domain location according to an implementation of this application.

For example, as shown in FIG. 5, the DL subcarrier spacing is 60 KHz, the UL subcarrier spacing is 15 KHz, a start point of a resource that calculates and feeds back the CSI is at least one symbol in which DCI signaling for triggering the aperiodic CSI reporting is located, and a defined time offset is defined based on a DL numerology. The DCI signaling is transmitted in at least one symbol in the slot n, and the offset is 5, where it is obtained through calculation that a slot of the aperiodic CSI reporting in the DL numerology is equal to n+5, and a slot of the aperiodic CSI reporting in the UL resource is equal to slot m+1 (a UL slot to which the slot n+5 is mapped).

It should be understood that, in FIG. 5, the start point of the resource that calculates and feeds back the CSI is a slot in which the DCI signaling for triggering the aperiodic CSI reporting is located or at least one symbol of the slot, and a slot of the aperiodic CSI reporting in the UL resource is equal to slot m+1.

Figure 6:
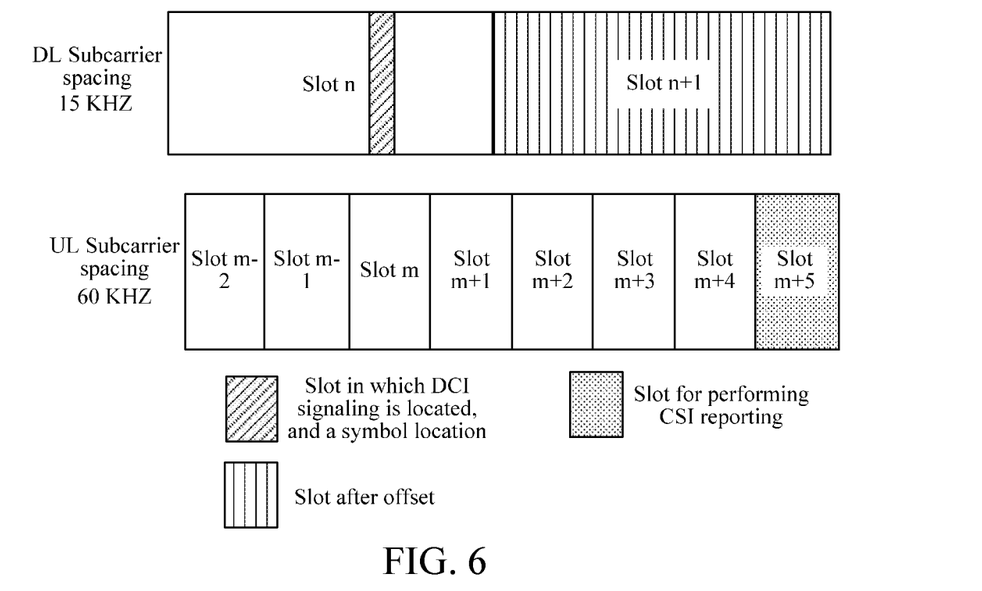
FIG. 6 is a location relationship diagram of a first DL time domain location and a first UL time domain location according to an implementation of this application.

For example, as shown in FIG. 6, a start point of a resource that calculates and feeds back the CSI is at least one symbol in which DCI signaling for triggering the aperiodic CSI reporting is located, and a defined time offset is defined based on a DL numerology. The DCI signaling is transmitted in at least one symbol in the slot n, and the offset is 1, where it is obtained through calculation that a slot of the aperiodic CSI reporting in the DL numerology is equal to n+1. When the slot n+1 is mapped to a plurality of UL slots, one (for example, a last slot or a first slot) of the slots may be used as a slot that feeds back the CSI. For example, as shown in FIG. 3, the CSI feedback may be performed in a last slot m+5 to which mapping is performed.

Optionally, for a situation shown in FIG. 6, the offset may be alternatively defined based on a relatively small time unit, and specifically, may be defined based on the UL numerology.

Optionally, when the first information triggers the semi-persistent CSI reporting, if the first DL time domain location is at least one of the symbols in which the first information is located, or a slot in which the first information is located, or a last symbol of the slot, the second DL time domain location may be obtained by adding the time offset to the first DL time domain location when CSI feedback is performed for the first time, the second DL time domain location may be obtained by adding twice the time offset to the first DL time domain location (in an actual calculation procedure, the second DL time domain location currently calculated may be obtained by adding the time offset to the second DL time domain location previously calculated) when CSI feedback is performed for the second time, and the rest can be deduced by analogy.

Optionally, when the first information triggers the semi-persistent CSI reporting, if the first DL time domain location is at least one of symbols in which a channel measurement resource for performing CSI measurement is located, or a slot in which the channel measurement resource for performing CSI measurement is located, or a last symbol of the slot; or at least one of symbols in which an interference resource for performing CSI measurement is located, or a slot in which the interference resource for performing CSI measurement is located, or a last symbol of the slot; or at least one of symbols in which a CSI reference resource is located, or a slot in which the CSI reference resource is located, or a last symbol of the slot, the channel measurement resource, the interference resource or the reference resource for performing current CSI measurement is used as the first DL time domain location, and the second DL time domain location corresponding to the current CSI feedback may be obtained by adding the time offset to the first DL time domain location.

Optionally, a subcarrier spacing of the UL transmission used for performing CSI reporting is different from a subcarrier spacing of the DL transmission performed in the first DL time domain location.

240. The terminal reports CSI in the first UL time domain location.

250. The network device determines the first UL time domain location according to the time offset and the first DL time domain location used as a start point, where a time unit length of the time offset is a time unit length of UL transmission used for performing CSI reporting, or a time unit length of DL transmission performed in the first DL time domain location.

Optionally, in this implementation of this application, the network device sends second information, where the second information is used for indicating the time offset to the terminal.

In an implementation, the time unit length of the time offset is the time unit length of the UL transmission, and the first DL time domain location is mapped to a second UL time domain location; a time domain location obtained by adding the time offset to the second UL time domain location is determined as the first UL time domain location.

In another implementation, the time unit length of the time offset is a time unit length of the DL transmission, and the second DL time domain location is obtained by adding the time offset to the first DL time domain location. The second DL time domain location is mapped to the first UL time domain location.

For a manner in which the network device determines the first UL time domain location, refer to the description on the terminal side. For brevity, details are not described herein again.

260. The network device receives the CSI reported by the terminal in the first UL time domain location.

Therefore, a terminal or a network device may determine a UL time domain location used for feeding back CSI according to a first DL time domain location used as a start point and with reference to a time offset with a time unit length which is a time unit length of UL transmission used for performing CSI reporting, or which is a time unit length of DL transmission performed in the first DL time domain location. As a result, a CSI feedback is implemented when a time unit length of UL transmission (which is specifically the UL transmission used for performing CSI reporting) and a time unit length of DL transmission (which is specifically the DL transmission performed in the first DL time domain location) are different, so as to be applicable to a flexible NR system in an aspect of CSI feedback. Moreover, further, in the present disclosure, the UL time domain location for the aperiodic or semi-persistent CSI reporting is obtained through calculation by applying a same rule to the network device and the terminal, to ensure that the terminal and the network device perform aperiodic or semi-persistent CSI transmission and receiving in a same location, thereby ensuring that the system can perform optimal scheduling according to the reported CSI.

Figure 7:
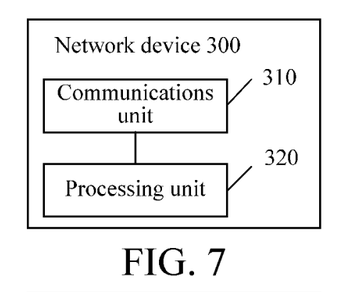
FIG. 7 is a schematic block diagram of a network device according to an implementation of this application.

FIG. 7 is a schematic block diagram of a network device 300 according to an implementation of this application. As shown in FIG. 7, the network device 300 includes a communications unit 310 and a processing unit 320.

The communications unit 310 is configured to: send first information, where the first information is carried in DCI, and is used for triggering a terminal to perform aperiodic CSI reporting or semi-persistent CSI reporting;

the processing unit is configured to: determine a first UL time domain location according to a time offset and a first DL time domain location used as a start point, where a time unit length of the time offset is a time unit length of UL transmission used for performing CSI reporting, or a time unit length of DL transmission performed in the first DL time domain location; and the communications unit is further configured to: receive CSI reported by the terminal in the first UL time domain location.

Optionally, the communications unit 310 is further configured to: send second information, where the second information is used for indicating the time offset to the terminal.

Optionally, the second information and the first information are carried in the same DCI.

Optionally, the first information is used for triggering the terminal to perform the semi-persistent CSI reporting; the first DL time domain location is a periodic time domain location, and the first UL time domain location is a periodic time domain location.

Optionally, the first DL time domain location is:

at least one of symbols in which the first information is located, or a slot in which the first information is located, or a last symbol of the slot; or at least one of symbols in which a channel measurement resource for performing CSI measurement is located, or a slot in which the channel measurement resource for performing CSI measurement is located, or a last symbol of the slot; or at least one of symbols in which an interference resource for performing CSI measurement is located, or a slot in which the interference resource for performing CSI measurement is located, or a last symbol of the slot; or at least one of symbols in which a CSI reference resource is located, or a slot in which the CSI reference resource is located, or a last symbol of the slot.

Optionally, the time unit length of the time offset is the time unit length of the UL transmission, and the processing unit 320 is further configured to:

map the first DL time domain location to a second UL time domain location; and determine a time domain location, obtained by adding n times the time offset to the second UL time domain location, as the first UL time domain location, where n is an integer greater than or equal to 1.

Optionally, the time unit length of the time offset is the time unit length of the DL transmission, and the processing unit 320 is further configured to:

obtain a second DL time domain location by adding n times the time offset to the first DL time domain location, where n is an integer greater than or equal to 1; and map the second DL time domain location to the first UL time domain location.

Optionally, the time unit length of the time offset is a slot.

Optionally, a subcarrier spacing of the UL transmission used for performing CSI reporting is different from a subcarrier spacing of the DL transmission performed in the first DL time domain location.

It should be understood that, the network device 300 may correspond to the network device in the method 200, and may implement corresponding operations of the network device in the method 200. For brevity, details are not described herein again.

Figure 8:
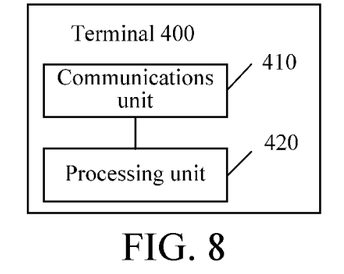
FIG. 8 is a schematic block diagram of a terminal according to an implementation of this application.

FIG. 8 is a schematic block diagram of a terminal 400 according to an implementation of this application. As shown in FIG. 8, the terminal 400 includes a communications unit 410 and a processing unit 420.

The communications unit 410 is configured to: receive first information, where the first information is carried in DCI, and is used for triggering aperiodic CSI reporting or quasi-periodic CSI reporting;

the processing unit 420 is configured to: determine a first UL time domain location according to a time offset and a first DL time domain location used as a start point, where a time unit length of the time offset is a time unit length of UL transmission used for performing CSI reporting, or a time unit length of DL transmission performed in the first DL time domain location; and the communications unit 410 is further configured to: report CSI in the first UL time domain location.

Optionally, the communications unit 410 is further configured to:

receive second information, where the second information is used for indicating the time offset.

Optionally, the second information and the first information are carried in the same DCI.

Optionally, the first information is used for triggering the terminal to perform the semi-persistent CSI reporting, the first DL time domain location is a periodic time domain location, and the first UL time domain location is a periodic time domain location.

Optionally, the first DL time domain location is:

at least one of symbols in which the second information is located, or a slot in which the second information is located, or a last symbol of the slot; or at least one of symbols in which a channel measurement resource for performing CSI measurement is located, or a slot in which the channel measurement resource for performing CSI measurement is located, or a last symbol of the slot; or at least one of symbols in which an interference resource for performing CSI measurement is located, or a slot in which the interference resource for performing CSI measurement is located, or a last symbol of the slot; or at least one of symbols in which a CSI reference resource is located, or a slot in which the CSI reference resource is located, or a last symbol of the slot.

Optionally, the time unit length of the time offset is the time unit length of the UL transmission, and the processing unit is further configured to:

map the first DL time domain location to a second UL time domain location; and determine a time domain location, obtained by adding n times the time offset to the second UL time domain location, as the first UL time domain location, where n is an integer greater than or equal to 1.

Optionally, the time unit length of the time offset is the time unit length of the DL transmission, and the processing unit is further configured to:

obtain a second DL time domain location by adding n times the time offset to the first DL time domain location, where n is an integer greater than or equal to 1; and map the second DL time domain location to the first UL time domain location.

Optionally, the time unit length of the time offset is a slot.

Optionally, a subcarrier spacing of the UL transmission used for performing CSI reporting is different from a subcarrier spacing of the DL transmission performed in the first DL time domain location.

It should be understood that, the terminal 400 may correspond to the terminal in the method 200, and may implement corresponding operations of the terminal in the method 200. For brevity, details are not described herein again.

Figure 9:
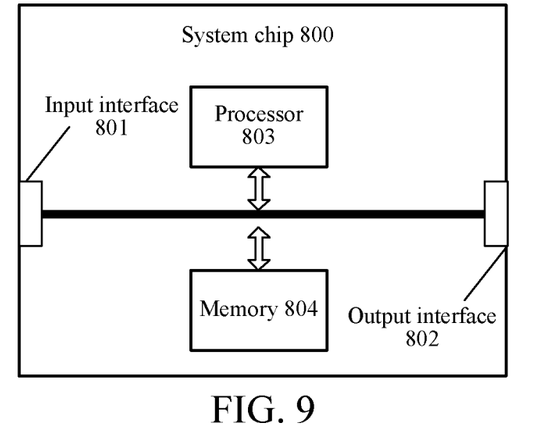
FIG. 9 is a schematic block diagram of a system chip according to an implementation of this application.

FIG. 9 includes an input interface 801, an output interface 802, a processor 803 and a memory 804 that may be connected to each other by using an internal communications connection line, and the processor 803 is configured to execute code in the memory 804.

Optionally, when the code is executed, the processor 803 implements the method performed by the network device in the method implementation. For brevity, details are not described herein again.

Optionally, when the code is executed, the processor 803 implements the method performed by the terminal in the method implementation. For brevity, details are not described herein again.

Figure 10:
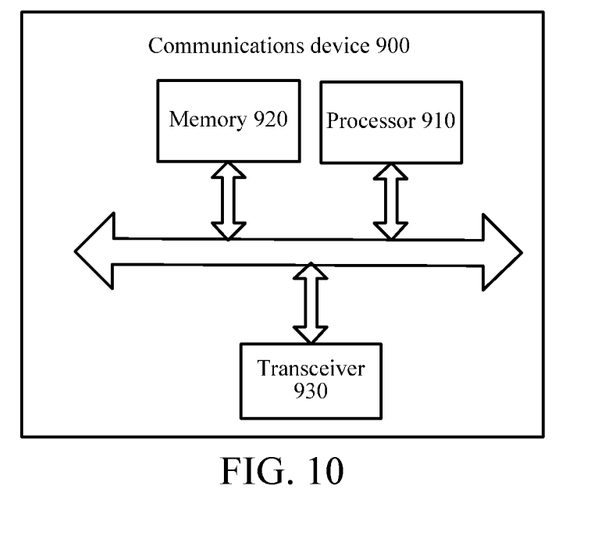
FIG. 10 is a schematic block diagram of a communications device according to an implementation of this application.

FIG. 10 is a schematic block diagram of a communications device 900 according to an implementation of this application. As shown in FIG. 10, the communications device 900 includes a processor 910 and a memory 920. The memory 920 may store program code, and the processor 910 may execute the program code stored in the memory 920.

Optionally, as shown in FIG. 10, the communications device 900 may include a transceiver 930, and the processor 910 may control the transceiver 930 to communicate with the outside.

Optionally, the processor 910 may invoke program code stored in the memory 920, to perform corresponding operations of the network device in the method implementation. For brevity, details are not described herein again.

Optionally, the processor 910 may invoke program code stored in the memory 920, to perform corresponding operations of the terminal in the method implementation. For brevity, details are not described herein again.

It should be understood that, the processor of this implementation of this application may be an integrated circuit chip, and has a signal processing capability. During implementation, the steps of the foregoing method implementation may be implemented by using a hardware integrated logic circuit in the processor or implemented by using an instruction in a software form. The foregoing processor may be a general purpose processor, a digital signal processor (DSP), an application-specific integrated circuit (ASIC), a field programmable gate array (FPGA), or another programmable logical device, discrete gate or transistor logical device, or discrete hardware component. The processor may implement or perform methods, steps and logical block diagrams disclosed in the implementations of this application. The general purpose processor may be a microprocessor or the processor may be any conventional processor and the like. Steps of the methods disclosed with reference to the implementations of this application may be directly executed and completed by means of a hardware decoding processor, or may be executed and completed by using a combination of hardware and software modules in the decoding processor. The software module may be located in a mature storage medium in the field, such as a random access memory, a flash memory, a read-only memory, a programmable read-only memory, an electrically-erasable programmable memory, or a register. The storage medium is located in the memory, and the processor reads information in the memory and completes the steps in the foregoing methods in combination with hardware of the processor.

It can be understood that, the memory in the implementations of this application may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM) or a flash memory. The volatile memory may be a random access memory (RAM), and is used as an external cache. Through exemplary but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM) and a direct rambus random access memory (DR RAM). It should be noted that, the memory for the system and the method described herein aims to include but not limited to these memories and any other suitable types of memories.

A person of ordinary skill in the art may be aware that, in combination with the examples described in the implementations disclosed in this specification, units and algorithm steps may be implemented by electronic hardware, or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, reference may be made to a corresponding process in the foregoing method implementations, and details are not described herein again.

In the several implementations provided in this application, it should be understood that the disclosed system, apparatus, and method may be implemented in other manners. For example, the described apparatus implementation is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the implementations.

In addition, functional units in the implementations of this application may be integrated into one processing unit, or each of the units may exist alone physically, or two or more units are integrated into one unit.

When the functions are implemented in a form of a software functional module and sold or used as an independent product, the functions may be stored in a computer-readable storage medium. Based on such an understanding, the technical solutions of this application essentially, or the part contributing to the prior art, or part of the technical solutions may be implemented in the form of a software product. The computer software product is stored in a storage medium, and includes several instructions for instructing a computer device (which may be a personal computer, a server, a network device, and the like) to perform all or a part of the steps of the method described in the implementation of this application. The foregoing storage medium includes: any medium that can store program codes, such as a USB flash disk, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:
1. A wireless communications method, comprising:
sending first information, wherein the first information is carried in downlink control information (DCI), and the first information is configured to trigger a terminal to perform aperiodic channel state information (CSI) reporting or semi-persistent CSI reporting;
determining a first uplink (UL) time domain location according to a time offset and a first downlink (DL) time domain location used as a start point, wherein a time unit length of the time offset is a time unit length of UL transmission used in CSI reporting, or a time unit length of DL transmission performed in the first DL time domain location;
receiving CSI reported by the terminal in the first UL time domain location; and
sending second information, wherein the second information is used for indicating the time offset to the terminal, and the second information and the first information are carried in the same DCI, wherein the first DL time domain location used as the start point comprises a downlink slot where a DCI signaling is located, and the time unit length of the time offset is a slot, wherein determining the first UL time domain location according to the time offset and the first DL time domain location used as the start point comprises:

mapping the downlink slot where the DCI signaling is located to a uplink slot; and determining the first UL time domain location by adding the time offset to the uplink slot.

2. The wireless communications method according to claim 1, wherein the first DL time domain location is in:
a slot in which second information is located.

3. The wireless communications method according to claim 1, wherein a subcarrier spacing of the UL transmission used for performing the CSI reporting is different from a subcarrier spacing of the DL transmission performed in the first DL time domain location.

4. A wireless communications method, comprising:
receiving, by a terminal device, first information, wherein the first information is carried in DCI, and the first information is configured to trigger aperiodic CSI reporting or semi-persistent CSI reporting;
determining, by the terminal device, a first uplink (UL) time domain location according to a time offset and a first downlink (DL) time domain location used as a start point, wherein a time unit length of the time offset is a time unit length of UL transmission used in CSI reporting, or a time unit length of DL transmission performed in the first DL time domain location;
reporting CSI in the first UL time domain location; and
receiving second information, wherein the second information is used for indicating the time offset to the terminal, and the second information and the first information are carried in the same DCI,
wherein the first DL time domain location used as the start point comprises a downlink slot where a DCI signaling is located, and the time unit length of the time offset is a slot,
wherein determining the first UL time domain location according to the time offset and the first DL time domain location used as the start point comprises:
mapping the downlink slot where the DCI signaling is located to a uplink slot; and
determining the first UL time domain location by adding the time offset to the uplink slot.

5. The wireless communications method according to claim 4, wherein the first DL time domain location is in:
a slot in which second information is located.

6. The wireless communications method according to claim 4, wherein a subcarrier spacing of the UL transmission used for performing the CSI reporting is different from a subcarrier spacing of the DL transmission performed in the first DL time domain location.

7. A network device, comprising a transceiver and a processor, wherein
the transceiver is configured to: send first information, wherein the first information is carried in DCI, and is configured to trigger a terminal to perform aperiodic CSI reporting or semi-persistent CSI reporting;
the processor is configured to: determine a first UL time domain location according to a time offset and a first DL time domain location used as a start point, wherein a time unit length of the time offset is a time unit length of UL transmission used for performing CSI reporting, or a time unit length of DL transmission performed in the first DL time domain location;
the transceiver is further configured to:
receive CSI reported by the terminal in the first UL time domain location, and send second information, wherein the second information is used for indicating the time offset to the terminal and the second information and the first information are carried in the same DCI,
wherein the first DL time domain location used as the start point comprises a downlink slot where a DCI signaling is located, and the time unit length of the time offset is a slot,
wherein the processor is further configured to:
map the downlink slot where the DCI signaling is located to a uplink slot; and
determine the first UL time domain location by adding the time offset to the uplink slot.

8. The network device according to claim 7, wherein the first DL time domain location is in:
a slot in which second information is located.

9. The network device according to claim 7, wherein a subcarrier spacing of the UL transmission used for performing the CSI reporting is different from a subcarrier spacing of the DL transmission performed in the first DL time domain location.

10. A terminal, comprising a transceiver and a processor, wherein
the transceiver is configured to: receive first information, wherein the first information is carried in DCI, and is configured to trigger aperiodic CSI reporting or semi-persistent CSI reporting;
the processor is configured to: determine a first UL time domain location according to a time offset and a first DL time domain location used as a start point, wherein a time unit length of the time offset is a time unit length of UL transmission used for performing CSI reporting, or a time unit length of DL transmission performed in the first DL time domain location;
the transceiver is further configured to: report CSI in the first UL time domain location; and
receive second information, wherein the second information is used for indicating the time offset to the terminal, and the second information and the first information are carried in the same DCI,
wherein the first DL time domain location used as the start point comprises a downlink slot where a DCI signaling is located, and the time unit length of the time offset is a slot,
wherein the processor is further configured to:
map the downlink slot where the DCI signaling is located to a uplink slot; and
determine the first UL time domain location by adding the time offset to the uplink slot.

11. The terminal according to claim 10, wherein the first DL time domain location is in:
a slot in which second information is located.

12. The terminal according to claim 10, wherein a subcarrier spacing of the UL transmission used for performing the CSI reporting is different from a subcarrier spacing of the DL transmission performed in the first DL time domain location.

* * * * *